United States Patent
Deniau et al.

(10) Patent No.: US 10,118,447 B2
(45) Date of Patent: Nov. 6, 2018

(54) TIRE PRESSURE MONITORING SENSOR MOUNTING TOOL AND METHOD OF USING THE SAME

(71) Applicant: Continental Automotive Systems, Inc., Auburn Hills, MI (US)

(72) Inventors: Jean-Christophe Deniau, Fenton, MI (US); Martin Jankowski, Macomb, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 207 days.

(21) Appl. No.: 14/685,832

(22) Filed: Apr. 14, 2015

(65) Prior Publication Data

US 2016/0303929 A1 Oct. 20, 2016

(51) Int. Cl.
*B60C 23/04* (2006.01)
*B23P 19/04* (2006.01)
*B25B 27/00* (2006.01)

(52) U.S. Cl.
CPC ...... *B60C 23/0498* (2013.01); *B25B 27/0035* (2013.01); *B25B 27/0078* (2013.01)

(58) Field of Classification Search
CPC ............ B60C 23/0498; B25B 27/0035; B25B 27/0078
See application file for complete search history.

(56) References Cited

U.S. PATENT DOCUMENTS 3,398,445 A * 8/1968 Westendorf ............ H01R 43/22
29/270

* cited by examiner

*Primary Examiner* — John C Hong

(57) ABSTRACT

A tool is configured to install a tire pressure monitoring (TPM) sensor in a tire rim of a vehicle tire. The tool includes a lever having a rotational movement about a rotational axis; a cam selectively coupled to the lever; and a push pin selectively coupled to the cam. The cam translates the rotational movement of the lever into a liner or translational movement of the push pin. The linear or translational movement is effective to impact or move a roll pin of a tire pressure monitoring (TPM) sensor disposed at the tool, such that portions of the TPM sensor or pushed through an opening in a tire rim.

2 Claims, 12 Drawing Sheets

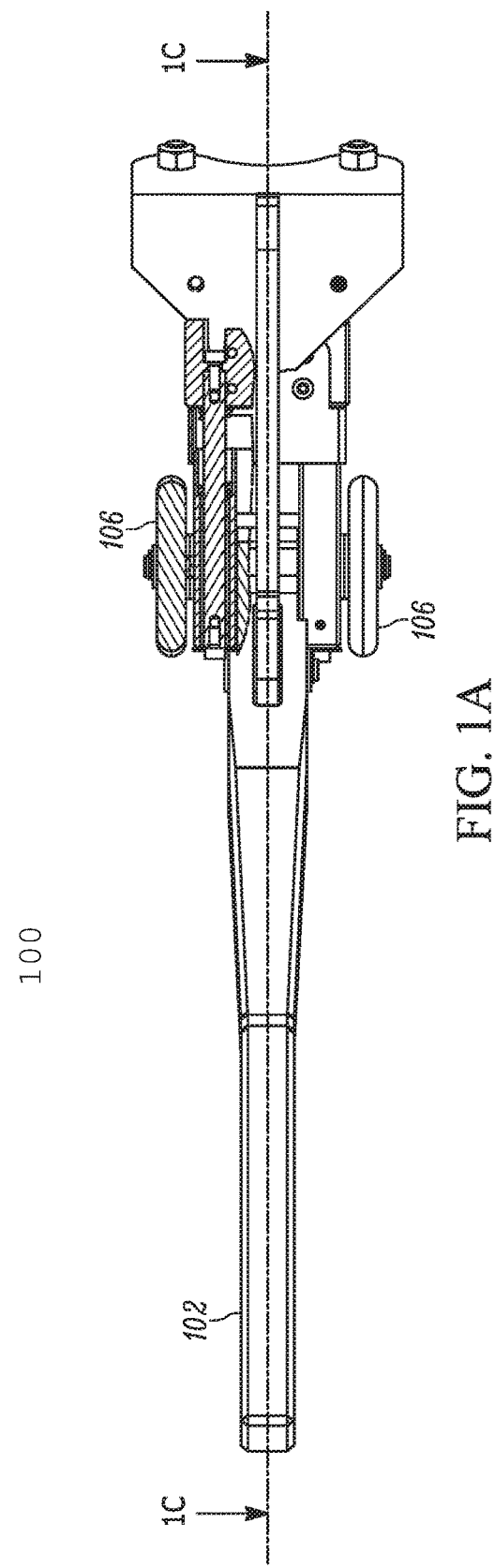

US 10,118,447 B2

TIRE PRESSURE MONITORING SENSOR MOUNTING TOOL AND METHOD OF USING THE SAME

TECHNICAL FIELD

This application relates to tire pressure monitors, and more specifically, the operation of these devices.

BACKGROUND OF THE INVENTION

Tire pressure monitoring (TPM) sensors are deployed that take the pressure (and possibly other readings such as temperature) of the tire of the vehicle. The sensors transmit the tire pressure data (and possibly other data) to a receiver (e.g., an electronic control unit) in a vehicle. The receiver may compare the measured pressure to a threshold and if the measured pressure is below a threshold, issue an alert to a driver.

TPM sensors are mounted on the rim of a tire using a mounting tool. However, many tire pressure sensor mounting tools used by different rim assemblers and at different OEM plants are complicated, fragile, and require much maintenance. This maintenance time associated with these tools automatically increases the down time for production lines, thus leading to increased costs. Various parts of these tools frequently break, especially the parts associated with inserting the TPM sensor rubber valve stem into the rim hole. The problems associated with breakages lead to significant user frustration with these previous approaches.

All of the above-mentioned problems have resulted in user dissatisfaction with previous approaches.

BRIEF DESCRIPTION OF THE DRAWINGS

For a more complete understanding of the disclosure, reference should be made to the following detailed description and accompanying drawings wherein:

FIG. 1A comprises a diagram of a tool according to various embodiments of the present invention;

Figure 1B:
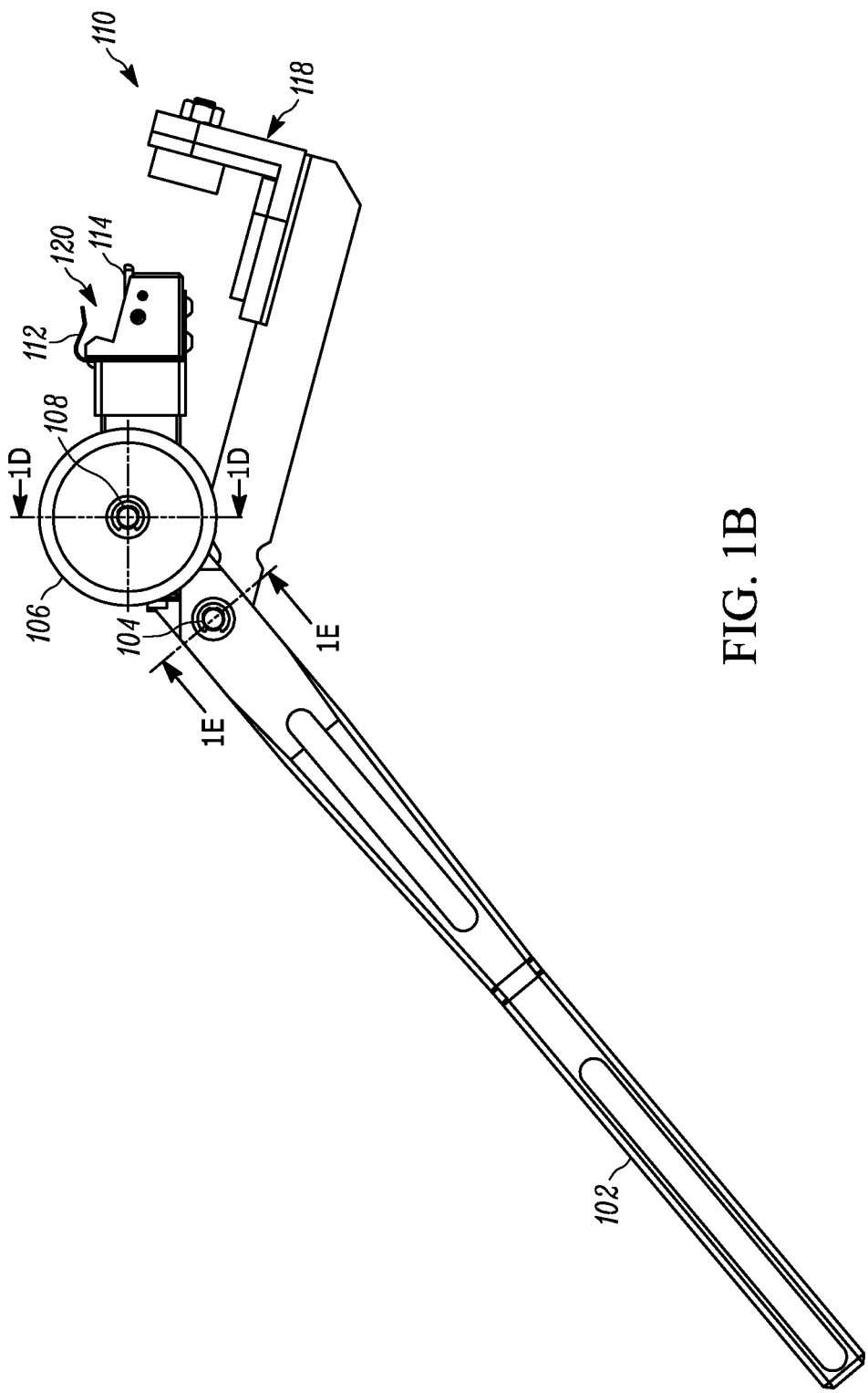
FIG. 1B comprises a diagram of the tool of FIG. 1A according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The present approaches provide a tire pressure monitoring (TPM) sensor mounting tool that facilitates easy attachment of a TPM sensor to the rim of a tire through one motion of the user with a handle of the tool. In these approaches, the TPM sensor includes a valve stem portion and a sensor portion that are integral with each other, or separate and coupled together. The tool includes a push pin or other pushing mechanism, which pushes or moves a roll pin of the TPM sensor. More specifically and in one example, the push pin of the tool pushes the roll pin of the sensor, thereby moving, carrying, or pushing the sensor (valve stem portion and sensor portion) such that at least some portions of the sensor (e.g., portions of the valve stem portion) pass through an opening in the rim. The valve stem portion may have a portion of narrower diameter that snaps into position when this portion enters the rim hole thereby securing the TPM sensor to the rim.

In a minimum of motions for the tool, the TPM sensor is easily and quickly inserted into the rim. Advantageously, the present approaches increase the robustness of the insertion process, decrease the maintenance needed for the tool, and decrease the demand made upon and downtime associated with tire pressure monitor sensor mounting tools. In other advantages associated with the present approaches, stress on the internal components of the tool including the push pin is minimized. Additionally, the tool is constructed with a greatly reduced number of components compared to previous tools resulting in cost savings.

The tool may have wheels that may at some points in the insertion process touch the rim. However, the present approaches de-correlate the motion of rotation of the wheels and the translation of the sensor into the rim hole. At the end of the mounting stroke of the sensor, the wheels of the tool start moving upward and are not in contact with the rim. In one aspect, this approach helps avoid breakage problems with the push-pin of the sensor.

In many of these embodiments, a tool is configured to install a tire pressure monitoring (TPM) sensor in a tire rim of a vehicle tire. The tool includes a lever having a rotational movement about a rotational axis; a cam selectively coupled to the lever; and a push pin selectively coupled to the cam. The cam translates the rotational movement of the lever into a liner or translational movement of the push pin. The linear or translational movement is effective to impact or move a roll pin of a tire pressure monitoring (TPM) sensor disposed at the tool, such that portions of the TPM sensor are pushed through an opening in a tire rim.

In other aspects, the cam is coupled to a spring. In other examples, after the sensor passes through the opening, the push pin is allowed to return to an original position.

In other examples, the tool further includes a cradle. In some examples, the cradle temporarily houses portions of the TPM sensor. In other aspects, the cradle remains stationary as the sensor moves. In still other examples, the sensor that extends through the opening is a valve stem portion.

In others of these embodiments, a mounting tool is used to install a TPM sensor at an opening of a tire rim. The tool is attached at least temporarily to the tire rim. At least a portion of the TPM sensor is disposed at the tool. A lever of the tool is rotated in a rotational movement. A cam at the tool translates the rotational movement of the lever into a liner or translational movement of a push pin of the tool. The linear or translational movement is effective to push or impact a roll pin of the TPM sensor so as to move portions of the TPM sensor through an opening in the tire rim.

Figure 1C:
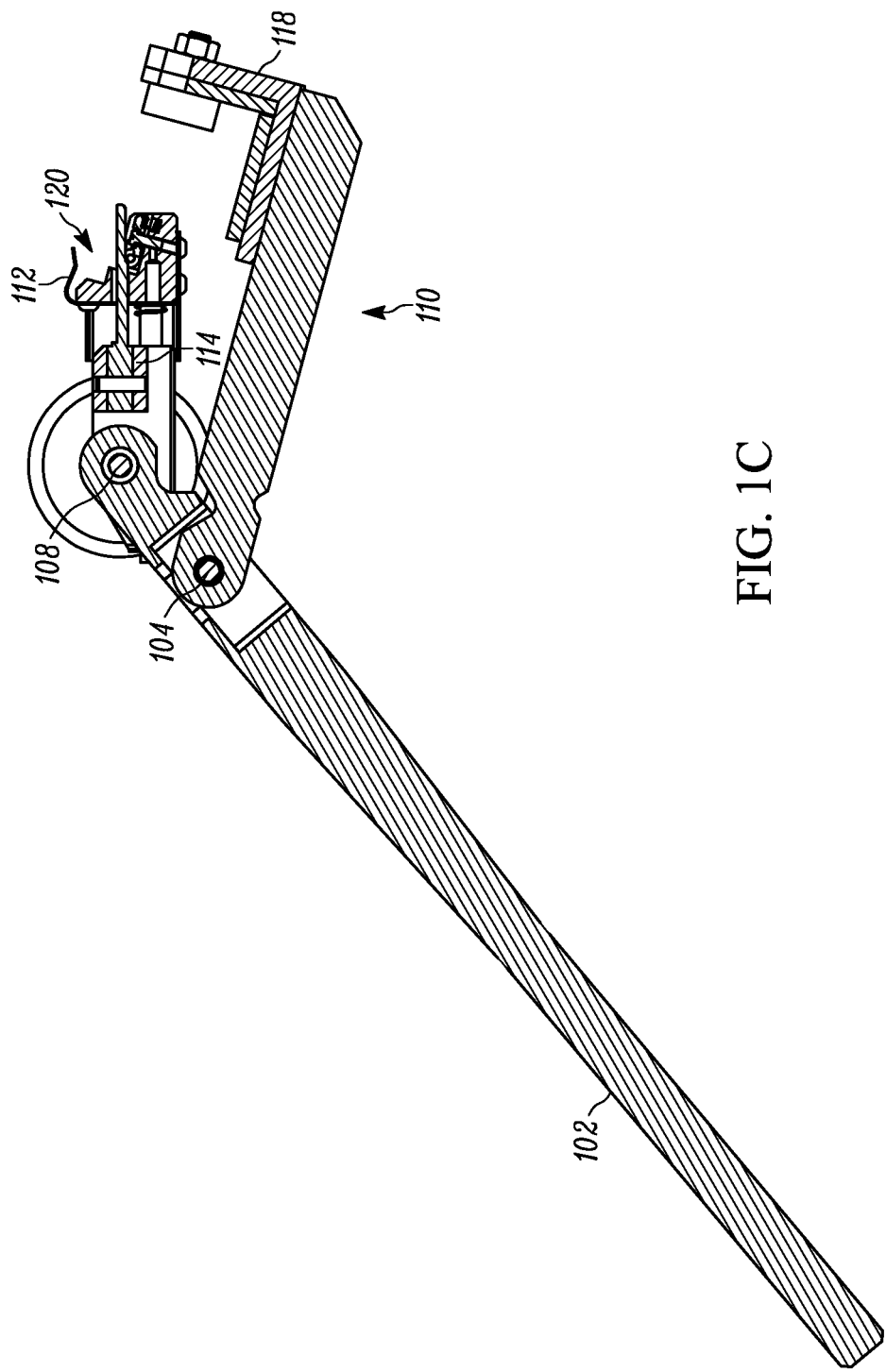
FIG. 1C comprises a diagram of the tool of FIG. 1A and FIG. 1B along line A-A according to various embodiments of the present invention.
Figure 1E:
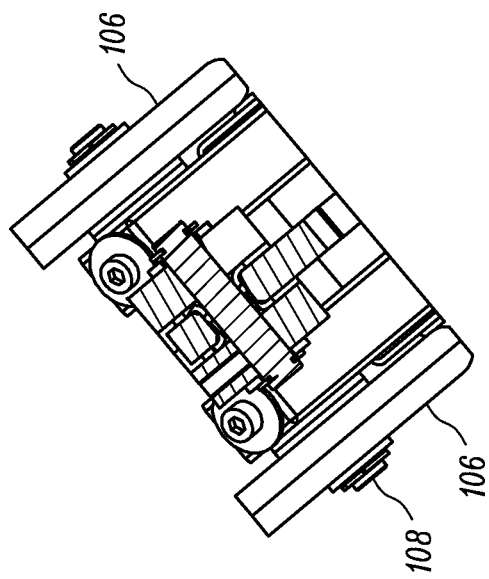
FIG. 1E comprises a diagram of the tool of FIGS. 1A-D and FIG. 1B along line C-C according to various embodiments of the present invention.
Figure 1D:
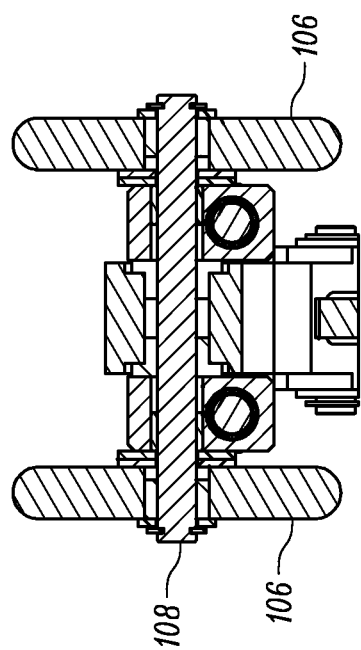
FIG. 1D comprises a diagram of the tool of FIGS. 1A-C along line B-B according to various embodiments of the present invention.

Referring now to FIGS. 1A, 1B, and 1C, a tool 100 includes a handle or lever 102. The handle 102 moves or rotates about an axis of rotation 104. At the end of the handle 102 are disposed wheels 106, which rotate about an axis of rotation 108. The wheels 106 may be at least temporarily pushed against the rim during insertion, but as the insertion stroke of the handle is made, the wheels 106 may lose contact with or not touch the rim thereby decoupling their movement with the translation of the sensor into the rim. Extending portion 110 protrudes from the portion of the tool where the wheels 106 are mounted and includes a tongue 112 to hold portions of the TPM sensor. Pusher element or push pin 114 pushes on a roll pin of a TPM sensor and this roll pin movement (or force impact on the roll pin) pushes, moves, or translates portions of the TPM sensor (e.g., the valve stem portion of the TPM sensor body) through the opening or hole in the rim. A gripper portion 118 grips the outside of the rim to facilitate attachment of portions of the TPM sensor through the opening in the rim.

A TPM sensor may include a valve stem portion and a sensor portion. The extending portion 110 of the tool forms a cradle 120 that in one example holds all or portions of the sensor portion of the TPM sensor. In some aspects a guillotine-like clip on the TPM sensor may secure the roll pin of the TPM sensor from moving. Pusher or push pin 114 moves the roll pin and may also release the clip. As the roll pin moves (by the impact of movement of the push pin 114 of the tool), the roll pin moves, pulls, or otherwise translates the body of the sensor through an opening or hole in the rim.

As the valve stem portion of the sensor moves through the opening, the valve stem portion stretches longitudinally. For example, the valve stem portion of the sensor may pass through the rim hole and horizontally stretch as it passes through the hole. Then, after the valve stem portion of the body of the sensor has passed through the hole in the rim, the valve stem portion of the body contracts back again to its original shape.

In some examples and as described elsewhere herein, the pusher or push pin 114 is telescoped and includes a nipple portion and a shoulder portion. The nipple portion is disposed on the very end of the push pin 114, and extends into the roll pin during the insertion process so as to guide movement of the roll pin. The shoulder portion couples or impacts against the roll pin and moves the roll pin as the push pin moves.

The lever 102 turns the wheels 106, which moves a cam (not shown in FIG. 1), which translates the turning rotational motion of the lever 102 to a motion that pushes the pusher or push pin 114. The push pin 114 pushes the roll pin of the sensor, which moves the sensor through an opening in the tire rim. As the lever 102 continues to rotate, the push pin 114 retracts back, allowing the push pin to return to its original position. The push pin 114 moves relative to the cradle 120, which is stationary.

Figure 2A:
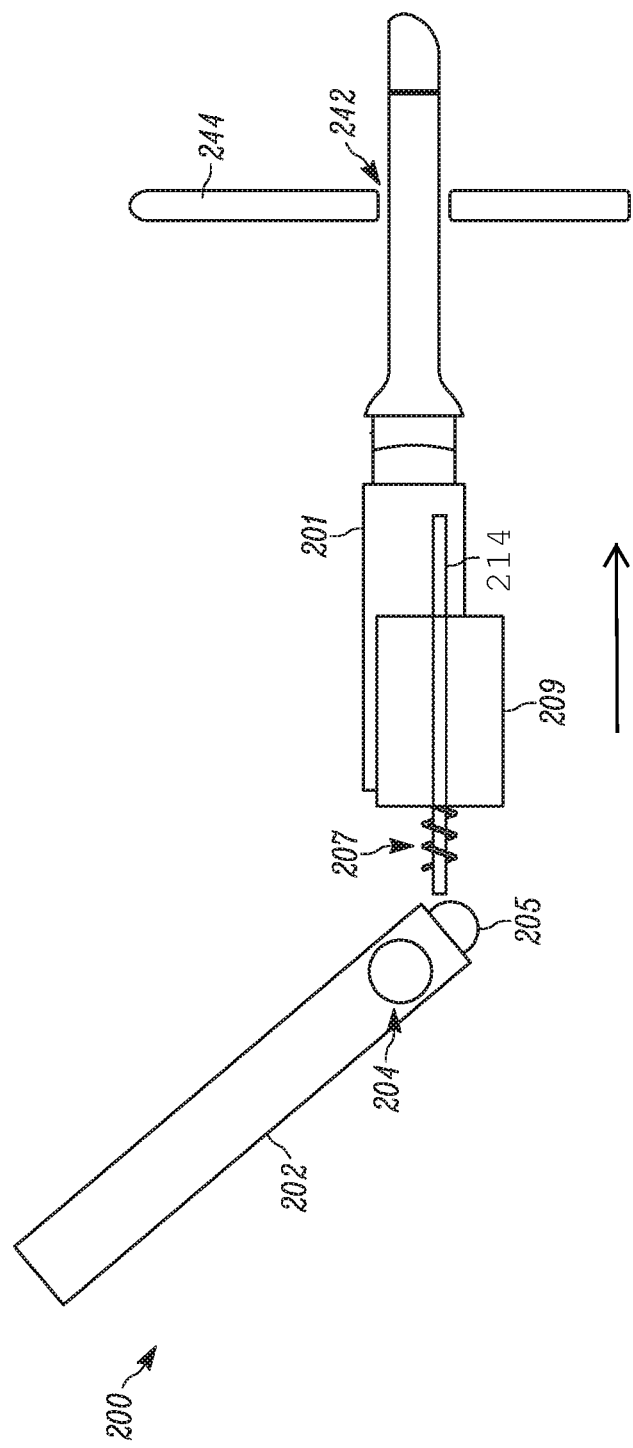
FIG. 2A comprises a diagram of the insertion of a TPM sensor in a rim with the sensor not being through the hole in the rim according to various embodiments of the present invention.
Figure 2B:
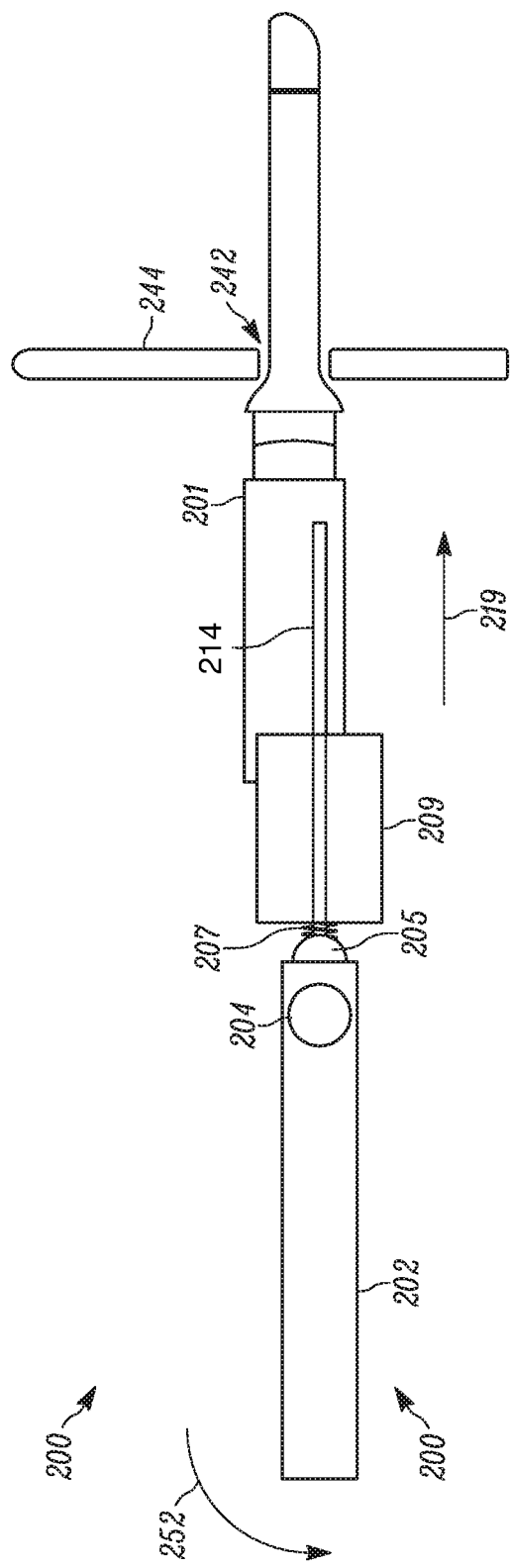
FIG. 2B comprises a diagram of the insertion of a TPM sensor in a rim with the sensor being partially through the hole in the rim according to various embodiments of the present invention.
Figure 2C:
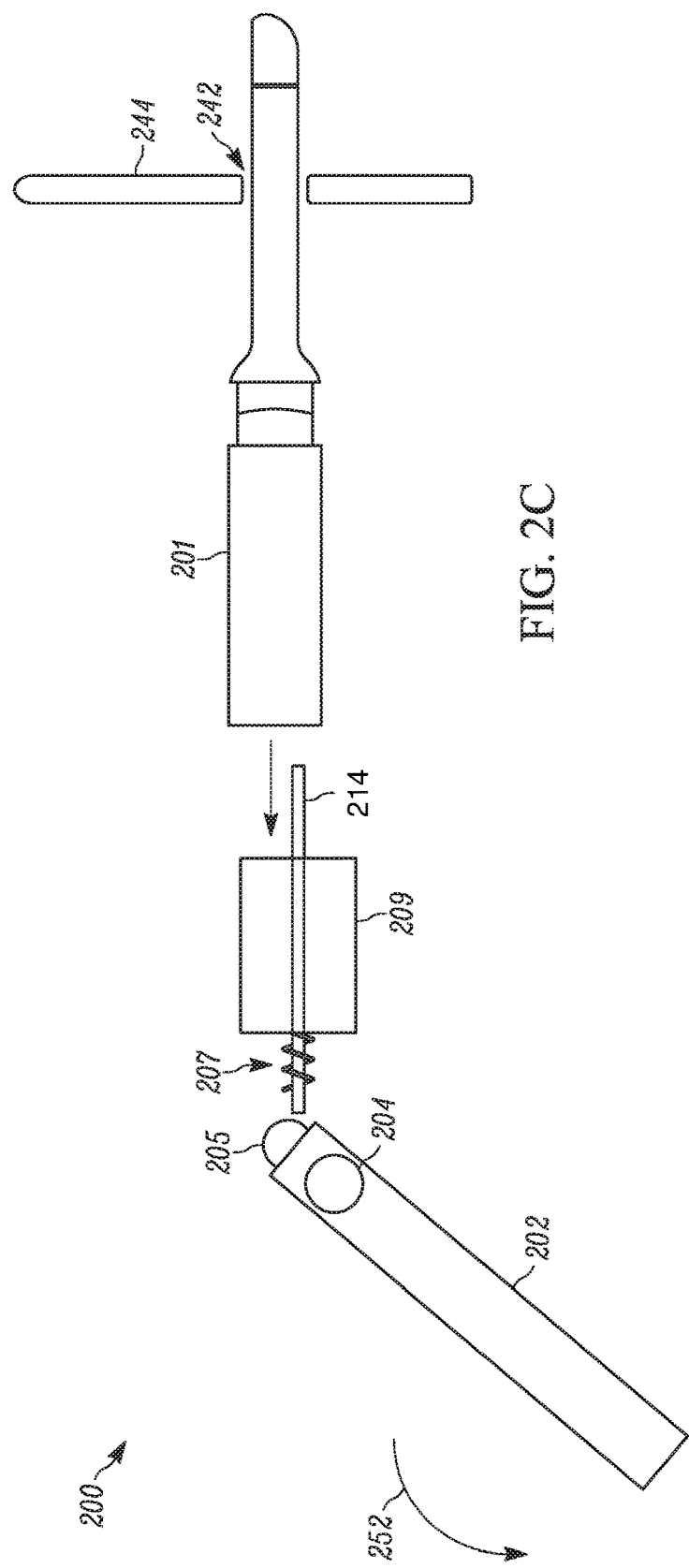
FIG. 2C comprises a diagram of the insertion of a TPM sensor with the sensor being in its final inserted position in a rim according to various embodiments of the present invention.
Figure 3A:
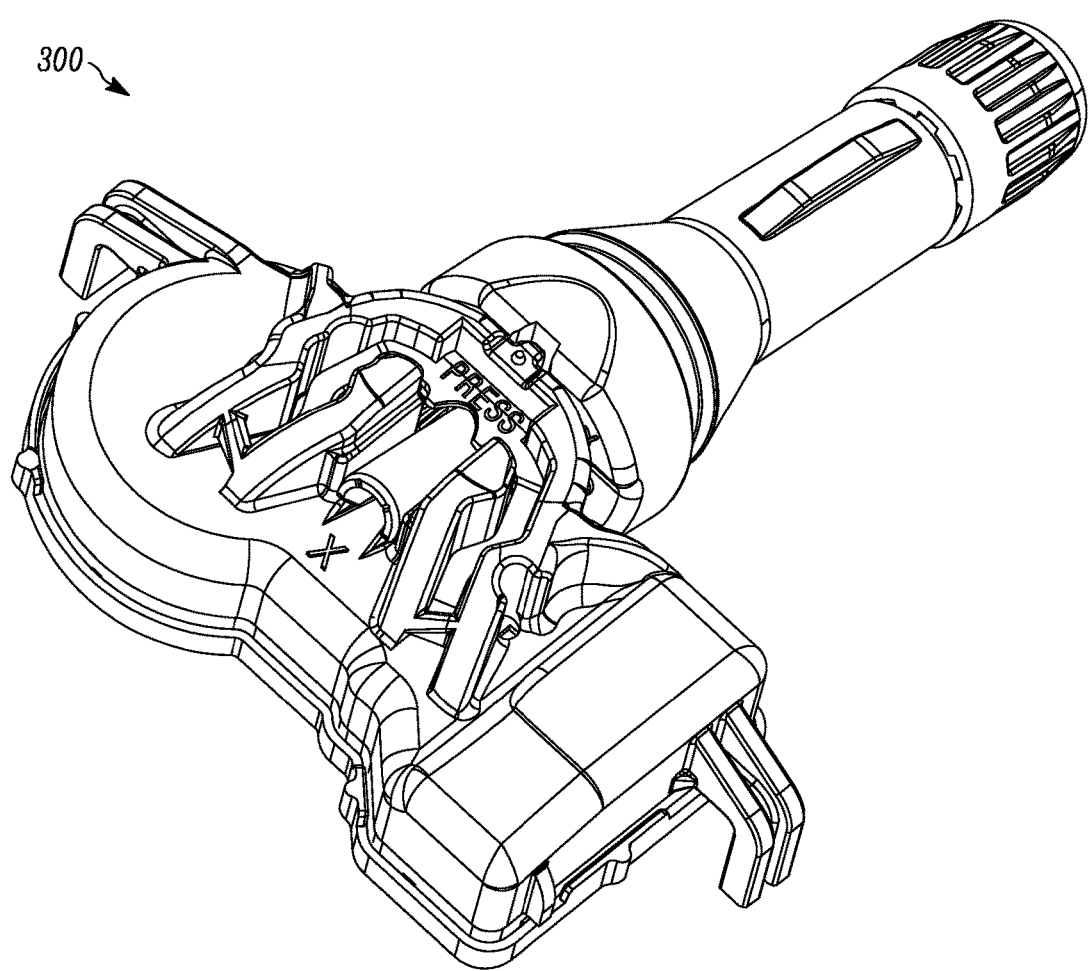
FIG. 3A comprises perspective drawing of a TPM sensor according to various embodiments of the present invention.
Figure 3C:
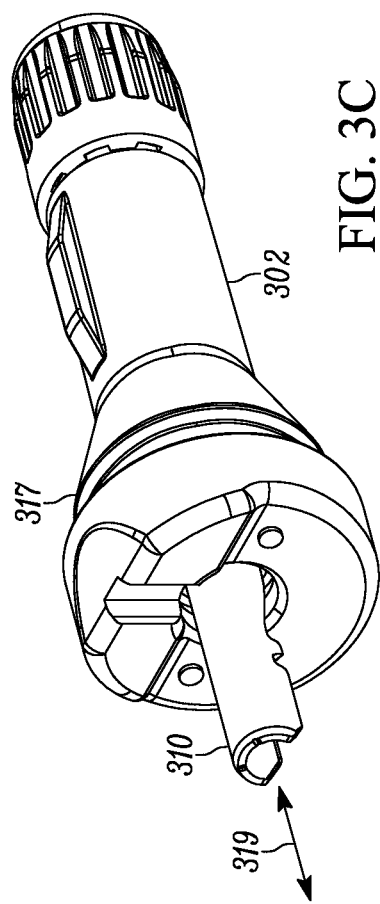
FIG. 3C comprises a diagram of the valve portion of the sensor of FIG. 3A according to various embodiments of the present invention.
Figure 3B:
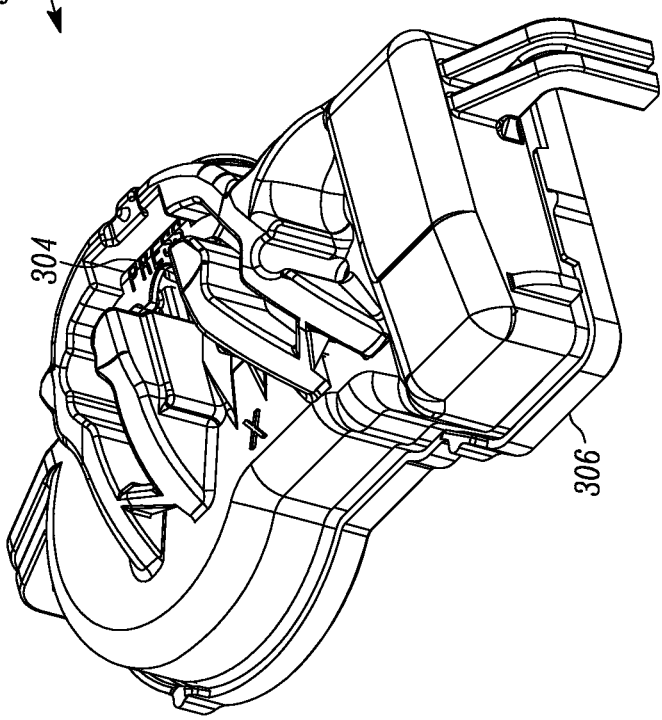
FIG. 3B comprises a perspective diagram of a sensor portion of the sensor of FIG. 3A according to various embodiments of the present invention.
Figure 3F:
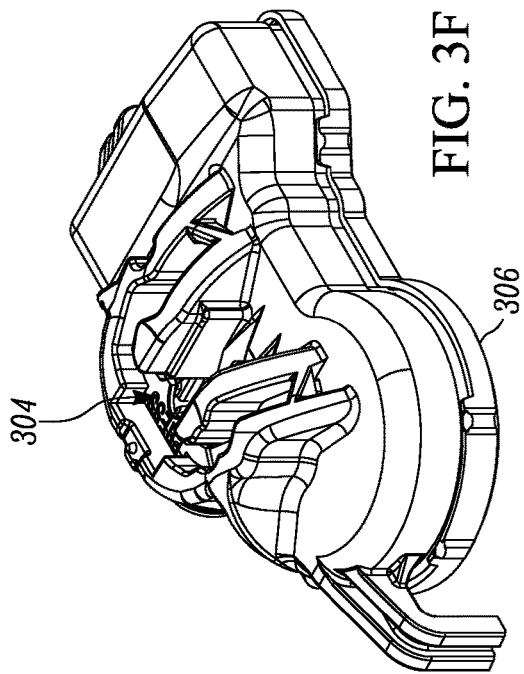
FIG. 3F comprises another perspective diagram of the sensor portion of the sensor showing the clip of FIG. 3A according to various embodiments of the present invention.
Figure 3D:
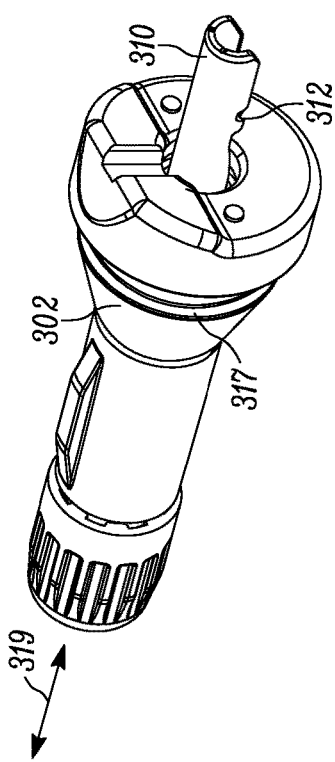
FIG. 3D comprises another perspective diagram of the valve portion of the sensor of FIG. 3A according to various embodiments of the present invention.
Figure 3E:
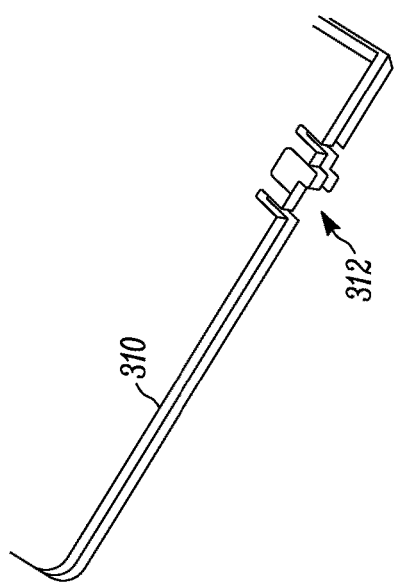
FIG. 3E comprises a perspective diagram of a portion of the roll pin showing grooves of the sensor of FIG. 3A according to various embodiments of the present invention.
Figure 3G:
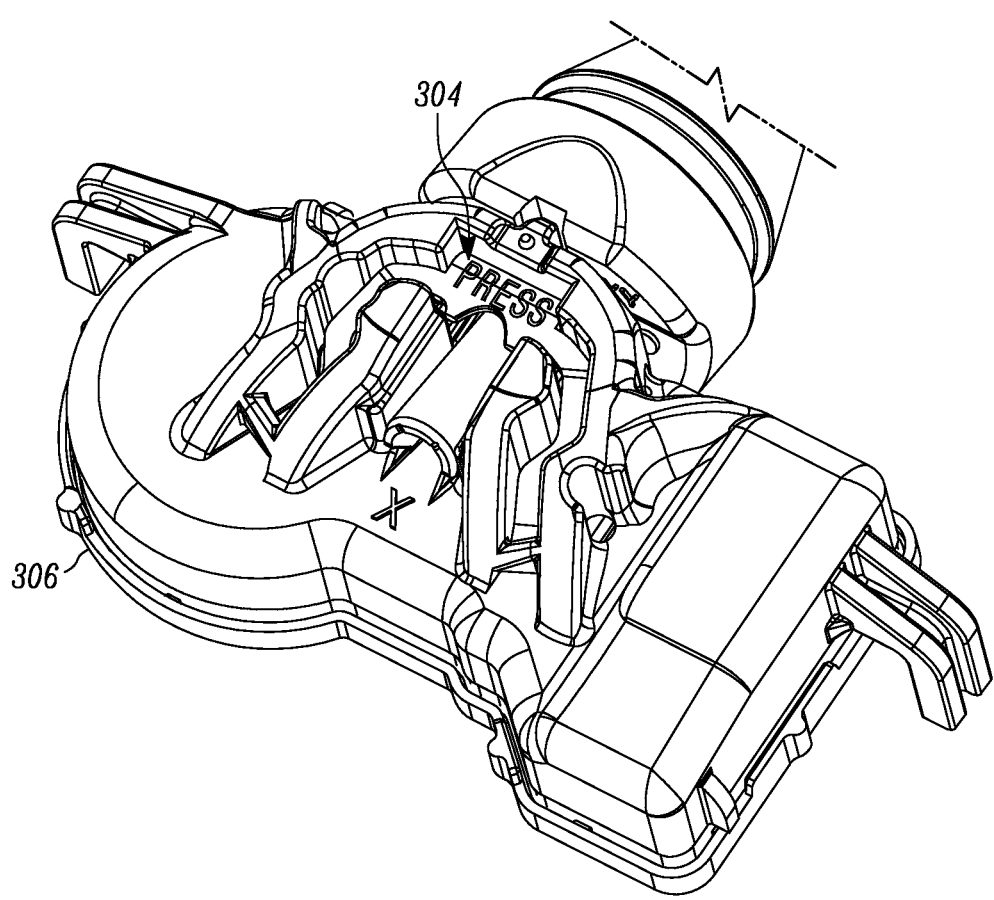
FIG. 3G comprises still another perspective diagram of the sensor portion of the sensor of FIG. 3A showing the clip according to various embodiments of the present invention.

Referring now to FIGS. 2A, 2B, and 2C one example of how a tool 200 (such as the tool of FIG. 1A-1E) is used to insert a TPM sensor 201 is described. As shown in these figures, a tool 200 includes a handle or lever 202. The handle 202 rotates about an axis of rotation 204 rotating a cam 205. At the end of the handle 202 are wheels (not shown). As the cam 205 rotates, the cam 205 moves a spring 207 in a movement in a direction indicated by the arrow labeled 219 and that movement 219 moves a pusher or push pin 214. The cam 205 may also directly move the push pin 214. In these regards, the cam 205 translates a rotational movement of the lever 202 to a translational (horizontal) movement 219. The push pin 214 pushes on a roll pin (not shown) of the sensor 201 to push, move, or otherwise the sensor (or portions of the sensor such as the valve stem portion of the sensor) through the opening 242 in the rim 244.

FIGS. 2A, 2B, and 2C show a sequence of operations in which portions of the sensor are installed through the opening of the rim. Referring now especially to FIG. 2A, the lever 202 in upright position. The sensor 201 is not yet through the hole or opening 242 in the tire rim 244.

Referring to FIG. 2B, the user rotates the lever 202 in the direction indicated by the arrow labeled 252. The cam 205 translates lever motion to lateral motion indicated by the arrow labeled 219 to move the push pin 214 via the spring 207 (or in other examples directly to the push pin 214 without a spring or intervening element). As the push pin 214 is moved, the push pin 214 extends out of the cradle 209 (in one aspect, in telescopic fashion) and pushes on the roll pin of the sensor. Pushing on the roll pin moves, pushes, or translates all or portions of the sensor 201 through the hole 242 in the rim 244. A set screw 211 may act as a stop when the push pin 214 returns to its original position but also acts as the outside shoulders of the current push pin 214.

Referring to FIG. 2C, the sensor 201 is shown as being inserted through the hole or opening 244. Lever 202 has continued to rotate and now is in a down position. The action of the cam 205 takes or pulls the push pin 214 back and this retracts to its original position. The set screw 211 acts as a stop when the push pin 214 returns to its original position.

It will be appreciate that the tool cradle 209 could be "mirror-imaged," meaning that the imprint of the TPM sensor 201 to be mounted on the rim 244 is on both the top and bottom of the cradle 209. Since the cam handle 202 has already passed the loading position, the operator can simply rotate the tool 180 degrees instead of positioning the handle in its original position (in FIG. 2A) when installing another TPM sensor.

Referring now to FIGS. 3A-3G, an example of a sensor 300 that has portions that are pushed through an opening in the rim of a tire is described. The sensor described in FIGS. 3A-3G in one aspect is the sensor used in any of the examples of FIG. 1 or 2.

The sensor 300 includes a valve stem portion (e.g., made of rubber) 302, a clip 304, and a sensor portion 306. When installed through an opening in the rim of a tire, the valve stem portion 302 extends outward from the rim, while the sensor portion 306 measures the pressure (and possibly other parameters such as temperature) of the tire. The valve stem portion 302 includes a roll pin 310 that is free to move laterally along the longitudinal axis 319 of the sensor 300 when not locked by the clip 304. The clip 304 locks into notches 312 of the roll pin 310 when in a locked position and is removed from the notches 312 when in an unlocked position. If the sensor 300 is equipped with a clip, the tool will have a mechanism to release the clip, for example, by pressing down on the clip to alternately release and lock the clip.

The valve stem portion 302 has an indented portion 317 that snaps into place as the valve stem portion 302 passes through the opening in the rim. In other words, the indented portion 317 is the portion of the valve stem portion 302 that is disposed in the opening in the rim. Additionally and as shown here, the valve stem portion and the sensor portion 306 are separate elements that couple together. However, in other examples, the valve stem portion and the sensor portion 306 may be integrally formed together.

Figure 4A:
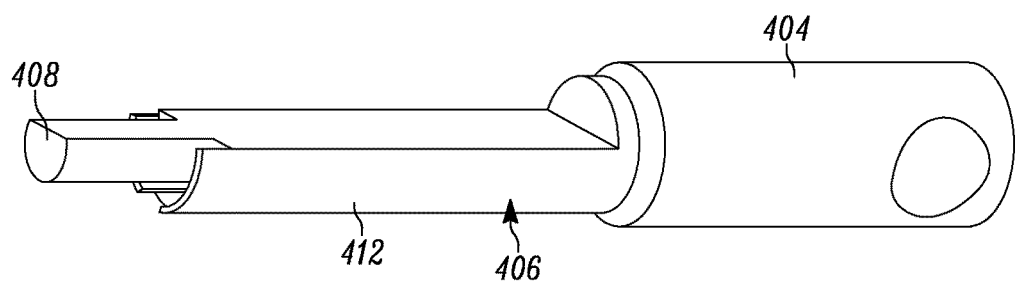
FIG. 4A comprises a perspective diagram of the tool head of a mounting tool according to various embodiments of the present invention.
Figure 4B:
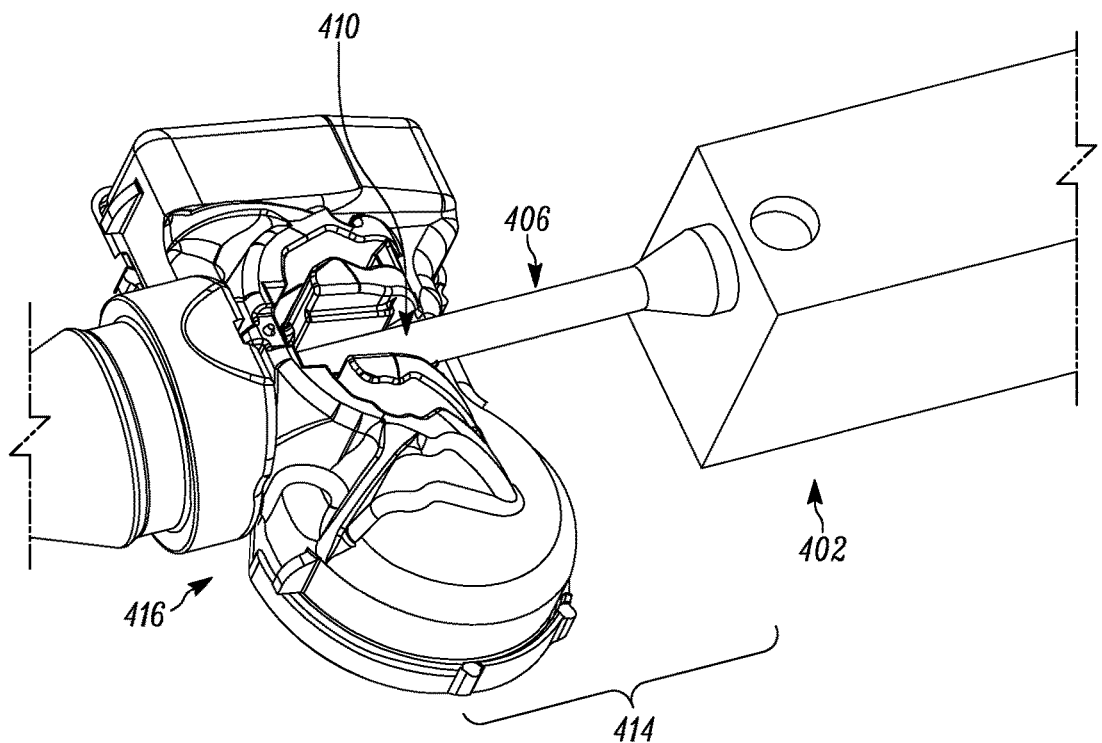
FIG. 4B comprises a perspective diagram showing the sensor head of FIG. 4A, the tool and the sensor according to various embodiments of the present invention.

Referring now to FIG. 4, one example of how the push pin pushes the roll pin is described. A mounting tool 402 includes a push pin 404 with a tool head 406. The tool head 406 in one aspect is telescopic and expands in length as the push pin 404 moves. The tool head 406 includes a nipple portion 408 and a shoulder portion 412.

The nipple portion 408 inserts into (within) a roll pin 410 of a TPM sensor 416. The shoulder portion 412 abuts or impacts against the roll pin 410 such that as the push pin 404 moves, the roll pin 410 moves. Movement of the roll pin 410 also moves a clip (not shown) allowing the roll pin 410 to move. As the roll pin 410 moves, the sensor 416 moves in the direction indicated by the arrow labeled 414. As the roll pin 410 moves, portions (e.g., the valve stem portion) of the sensor 416 are pushed through an opening in the rim of the tire as described elsewhere herein. In other words, movement of the lever or handle of the tool moves the push pin 404, pushing the roll pin 410, which moves the valve stem portion of the TPM sensor through and opening in the tire rim so that the sensor (e.g., portions of the valve stem portion) can snap in place within the opening of the rim. This is all accomplished with a simple tool where rotational lever movement is translated into a translational movement of the roll pin of the TPM sensor.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A tool configured to install a tire pressure monitoring (TPM) sensor in a tire rim of a vehicle tire, the tool comprising:
    a lever having first and second ends and a first axis proximate the second end about which the lever is able to rotate;
    a wheel rotatably attached to the lever by a second axis, the second axis being located between the second end and the first axis;
    a cam coupled to and extending from the second end of the lever;
    a push pin configured to be engaged and pushed by the cam, the push pin being sized, shaped and arranged to engage a TPM sensor roll pin and exert a substantially linear compressive force on the TPM sensor roll pin responsive to rotation of the lever around said first axis;
    wherein rotation of the lever around the first axis translates the push pin substantially linearly.

2. The tool of claim 1, wherein the push pin is coupled to a spring.

* * * * *